United States Patent [19]

Suzuki

[11] Patent Number: 5,251,871

[45] Date of Patent: Oct. 12, 1993

[54] FLUID FLOW CONTROL VALVE AND VALVE DISK

[76] Inventor: Isao Suzuki, c/o Hachiuoji Technical Center Nippon Tylan Co., Ltd. Ishikawa-cho 2971-8, Hachiouji-shi, Tokyo, Japan

[21] Appl. No.: 8,638

[22] Filed: Jan. 25, 1993

Related U.S. Application Data

[63] Continuation of Ser. No. 612,610, Nov. 13, 1990, abandoned.

[30] Foreign Application Priority Data

Nov. 14, 1989 [JP] Japan .................. 1-293804

[51] Int. Cl.⁵ .................. F16K 31/64; F16K 1/36
[52] U.S. Cl. .................. 251/127; 251/11; 251/121; 137/625.33
[58] Field of Search .................. 251/127, 121, 129.06, 251/11; 366/176; 137/625.33

[56] References Cited

U.S. PATENT DOCUMENTS

| | | | |
|---|---|---|---|
| 2,631,612 | 3/1953 | Buescher | 251/127 X |
| 3,219,063 | 11/1965 | Schumann et al. | 137/625.33 |
| 3,514,074 | 5/1970 | Self | 137/625.28 X |
| 3,729,025 | 4/1973 | Silvestrini | 137/625.33 |
| 3,920,044 | 11/1975 | Gruner | 251/127 X |
| 4,316,478 | 2/1982 | Gongwer | 251/121 X |
| 4,585,357 | 4/1986 | Ogata | 251/121 X |

*Primary Examiner*—Arnold Rosenthal
*Attorney, Agent, or Firm*—Thomas R. Morrison

[57] ABSTRACT

A fluid flow control valve includes a valve disk having a labyrinthine partition extending from its face. The partition describes a closed shape. The partition faces a valve seat. The range of control over the flow rate of a fluid is controlled by the length of the partition. Partition lengths are created by their shapes. Several complex shapes, giving rise to differing partition lengths are disclosed. An actuator urges the valve disk toward the valve seat to provide final control of the fluid flow.

4 Claims, 5 Drawing Sheets

FLUID FLOW CONTROL VALVE AND VALVE DISK

This is a continuation of application Ser. No. 07/612,610, filed Nov. 13, 1990, now abandoned.

BACKGROUND OF THE INVENTION

Fluid flow control valves used in the manufacture of devices, such as semiconductors, must be capable of adjusting precise fluid flow rates through an orifice as small as 40 microns. The structure of a valve chamber of such a fluid control valve consists of a valve disk interposed between a valve head and a valve seat. Vertical displacement of the valve head in relation to the valve seat creates an orifice through the valve disk to enable fluid from a primary (input) side to exit the valve at a secondary (output) side at a precise flow rate.

The flow rate (Q) of the control valve is proportional to the size of the orifice (l) and the diameter (D) of the valve seat and is expressed by the following equation:

$$Q = K\pi D l \sqrt{2g(P1 - P2)/Y}$$

where;
K is a constant
g is gravitational acceleration
Y is the specific gravity of a fluid
P1 is a primary side pressure and,
P2 is a secondary side pressure.

It can be seen that flow rate can be varied by changing at least one of the following: the size of the orifice (l), the size of the valve seat diameter (D), or the pressure difference (P1−P2).

In a conventional flow valve, the size of the orifice (l) must remain as small as 40 microns and the diameter of the valve seat (D) is restricted by the size of the flow valve. The pressure (P1−P2) cannot be increased, because as the pressure difference between the primary and secondary sides is increased, the valve head tends to be drawn by suction towards the valve seat, reducing the flow rate unpredictably, precluding accurate control of the flow rate. The increased suction can also apply excessive force to an actuator shaft that holds the valve head against the valve seat.

When the valve seat diameter (D) is enlarged, the pressure applied to the valve disk from the primary side increases, causing stress on the actuator that can result in premature breakdown.

For the reasons stated, a major disadvantage of conventional flow valves is that they cannot be adjusted to vary flow rate and must be replaced or modified for various job requirements.

U.S. Pat. No. 4,666,126 teaches a control valve wherein a flow passage is formed in a valve disk while two projecting ridges are provided on a peripheral edge of the lower surface of the valve disk. Fluid exits the orifice between these projecting ridges into the flow passage to widen the range of flow rate control. In this control valve, however, the widened range of flow rate control is attained by enlarging the area of a plane inside the inner projecting ridge. This results in constriction in the control valve flow passage that necessitates modification of the structure or replacement of the control valve to accommodate a higher flow rate.

OBJECTS AND SUMMARY OF THE INVENTION

Accordingly, it is an object of the present invention to provide a flow rate control valve that overcomes the drawbacks of the prior art.

It is a further object of the invention to provide a flow rate control valve that contains internal means for error correction to regulate a preset flow rate.

It is a still further object of the present invention to provide valve disks that minimize the need for modifying the structure of the control valve to increase the range of flow rate control. Even when the pressure difference between the primary (fluid input) and secondary (fluid output) sides is small, a wider range of flow rate control can be realized without having to increase the diameter of the valve disk.

The fluid flow control valve of the present invention has a valve chamber, a primary side passage introducing a fluid into the valve chamber from the fluid supply side, a secondary side passage leading out the fluid from the valve chamber, a control force means to control the flow rate of the fluid, a valve seat formed at the port of the primary side passage in the valve chamber, and a valve disk disposed opposite to the valve seat in the valve chamber and forming an orifice with the valve seat by pressure exerted by the control force. Either the valve disk or the valve seat is provided with a partition wall separating the primary side passage from the secondary side passage.

The partition extends at right angles to the valve disk in a closed pattern. The pattern separates the input from the output.

The valve disk is disposed in a valve chamber between a diaphragm pressed against the valve disk and a base block. Ends of a primary side passage and a secondary side passage emerge from the base block under the valve disk. Fluid entering the valve chamber from the primary side passage in the base block enters the center of the valve disk. The fluid spills over the partition in the valve disk to the secondary side passage.

According to the above described fluid flow control valve, the partition wall on the valve disk (or the valve seat) has a labyrinthine shape, thus providing a large linear wall length in a small space. This enables a large flow rate to be controlled with a small amount of primary side pressure without having to change the diameter of the valve seat.

The main body of the valve disk is matched to fit within the valve chamber, thus making it unnecessary to change the structure of the control valve housing to accommodate a change in flow rate. The flow rate regulation may be changed by changing the length of the closed curve formed by the partition wall of the valve disk requires changing. The positions of the control valve fluid passages of the control valve and other connected components remain fixed because the facing portions of partition wall separating the primary side passage from the secondary side passage are the same for all wall shapes. The length of the partition wall (S) plays a substantial role in enlarging the usual diameter D. Thus, the foregoing equation:

$$Q = K\pi D l \sqrt{2g(P1 - P2)/Y} \text{ changes to:}$$
$$Q = K S l \sqrt{2g(P1 - P2)/Y}$$

From the second equation, it can be seen that the flow rate (Q) can be varied by changing the peripheral length (S) of the partition wall when the type of the fluid, the pressure of the fluid, and the orifice opening (1) are fixed. Therefore, the range of control over the flow rate can be varied over a large range without changing the diameter (D) of the valve disk. A set of valve disks with partition walls of various circumferential lengths (S), enable the selection of a desired flow control range.

Briefly stated, the present invention provides a fluid flow control valve that includes a valve disk having a labyrinthine partition extending from its face. The partition describes a closed shape. The partition faces a valve seat. The range of control over the flow rate of a fluid is controlled by the length of the partition. Partition lengths are created by their shapes. Several complex shapes, giving rise to differing partition lengths are disclosed. An actuator urges the valve disk toward the valve seat to provide final control of the fluid flow.

According to an embodiment of the invention, there is provided a fluid flow rate control valve comprising: a valve chamber, a valve seat in the valve chamber, a valve disk in the valve chamber facing the valve seat, a partition on one of the valve seat and the valve disk, the partition facing the other of the valve seat and the valve disk, the partition forming a closed shape, means for admitting a pressurized fluid to a first side of the closed shape, means for discharging the pressurized fluid from a second side of the closed shape, and means for urging the valve disk toward the valve seat.

The above, and other objects, features and advantages of the present invention will become apparent from the following description read in conjunction with the accompanying drawings, in which like reference numerals designate the same elements.

BRIEF DESCRIPTION OF THE DRAWINGS

FIG. (1a) is a cross section of an embodiment of a fluid control valve using a valve disk according to an embodiment of the present invention.

DETAILED DESCRIPTION OF THE PREFERRED EMBODIMENTS

Figure 3:
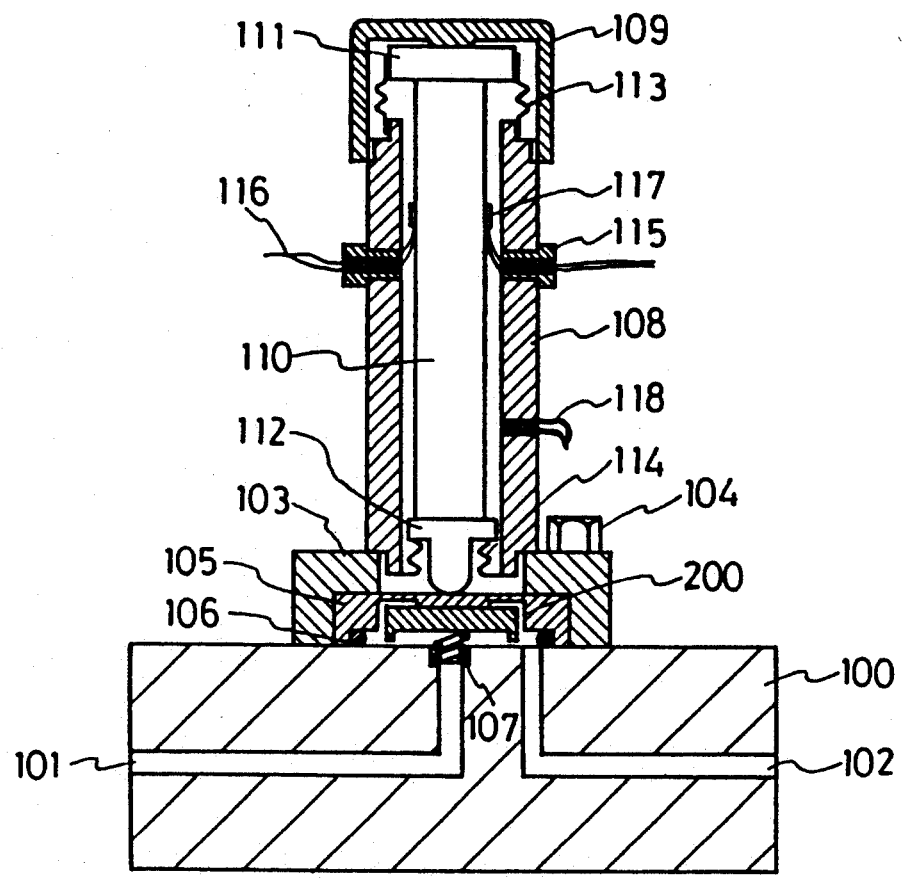
FIG. 3 is a cross section of a fluid control valve using an embodiment of the valve disk of FIG. 2.

Referring to FIG. 3, a fluid flow control valve of a normally open type includes a base block 100 having a primary side passage 101 and a secondary side passage 102. A valve base 103 is mounted on the upper part of base block 100 using, for example, a screw 104. A diaphragm 105 is disposed inside valve base 103. A space between diaphragm 105 and base block 100 is sealed by an O-ring 106. A valve disk 200 faces base block 100 below diaphragm 105. A spring 107 in a spring retaining hole surrounding the end of primary side passage 101 urges valve disk 200 in the upward direction. The area bounded by diaphragm 105 and the upper part of base block 100 constitutes a valve chamber.

A cylinder 108 is fixed to the top of valve base 103 by screws. An adjustable cap 109 is screwed on the upper part of cylinder 108. A piezo stack actuator 110 is held inside cylinder 108 by an upper spacer 111 at the top of piezo stack actuator 110 and a lower spacer 112 at the bottom of piezo stack actuator 110. The circumference of upper spacer 111 and the upper end of cylinder 108 are connected by an upper bellows 113. A lower end portion of a flange of lower spacer 112 and a lower end of cylinder 108 are connected by a lower bellows 114. Lower spacer 112 transmits a pressing force from piezo stack actuator 110 to diaphragm 105. Upper spacer 111 positions piezo stack actuator 110 in the vertical direction in accordance with a selected vertical position of adjustable cap 109.

A setting of an orifice for the passage of fluid can be made by adjusting the vertical position of adjustable cap 109 on valve disk 200.

Hermetically sealed fittings 115 in a central part of cylinder 108 permit the passage of lead wires 116 for connection to terminals 117 of piezo stack actuator 110.

Piezo stack actuator 110 consists of stacked piezo elements which may be degraded by moisture. To avoid this problem, upper bellows 113, lower bellows 114, terminals 117 and piezo stack actuator 110 are housed inside airtight cylinder 108. A gas entry hole 118 in cylinder 108 permits the introduction of an inert gas into the enclosure. The inert gas, preferably dry nitrogen, protects piezo stack actuator 110, and the remaining components from moisture, and other environmental contaminants.

Figure 4:
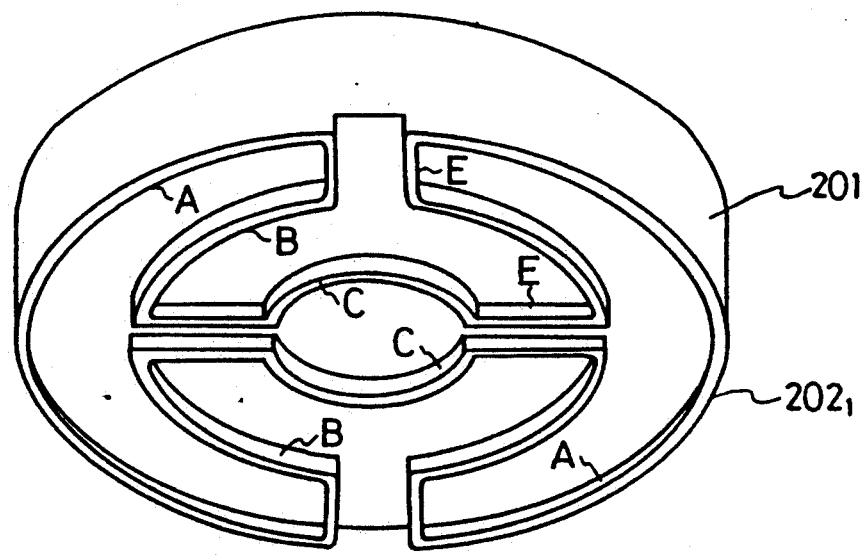
FIG. 4 is a perspective view of the valve disk shown in FIG. 2.

Referring now to FIG. 4, a valve disk $200_1$ has a disk shaped disk main body solid 201 fitted within the valve chamber formed by diaphragm 105 and base block 100. A partition wall $202_1$ extends vertically from disk main body 201. Partition wall $202_1$ forms a closed labyrinthine curve that separates primary side passage 101 from secondary side passage 102. Partition wall $202_1$ includes concentric inner, middle and outer circular part C, B and A, respectively. Each of the circular parts A, B and C has two openings which are bounded by bridges E to connect each circular part to its neighbor. It will be noted that circular parts A, B and C, together with bridges E, form a continuous closed curve. That is, if the faces of these elements are sealed against a surface, fluid flow from the center to the perimeter of valve disk $200_1$ is prevented.

A terminal end (spring retaining recess) of primary side passage 101 is positioned on the lower side of outer circular part A. Both the end face of partition wall $202_1$ and the contacting upper surface of base block 100 are polished to a specular finish.

The dimensions of the constitutional parts of valve disk $200_1$ may be selected according to the flow rate and pressure of the fluid to be controlled. When a differential pressure is 1 kg/cm$^2$G and the flow rate is about 30 SLM, the dimensions of valve disk 200 for example, may have a disk main body 201 with a diameter of 2 cm and a height of 1 cm, and a height of partition wall $202_1$ of from about 1 to about 2 mm.

FIGS. 5(a)-5(c), 6(a)-6(c), and 7(a)-7(d) show other variations of valve disk 200. The disk main bodies 201 of valve disks $200_2$ to $200_4$ are basically the same. However, the closed curves formed by partition walls $202_2$ to $202_4$ are shaped differently. The different shapes provide different lengths of the partition walls (i.e., the lengths of the closed curves) in order to permit valving of different quantities of fluid.

Figure 6A:
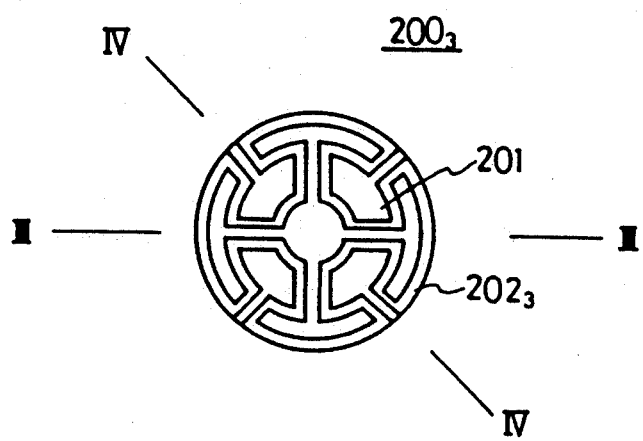
FIG. 6(a) is a bottom view of a valve disk according to a further embodiment of the invention.
Figure 6B:
FIGS. 6(b) and 6(c) are cross sections taken along III—III and IV—IV, respectively in FIG. 6(a).
Figure 6C:
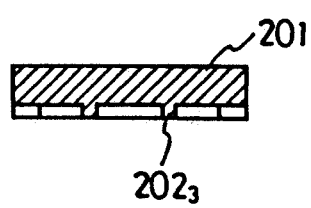
Figure 7A:
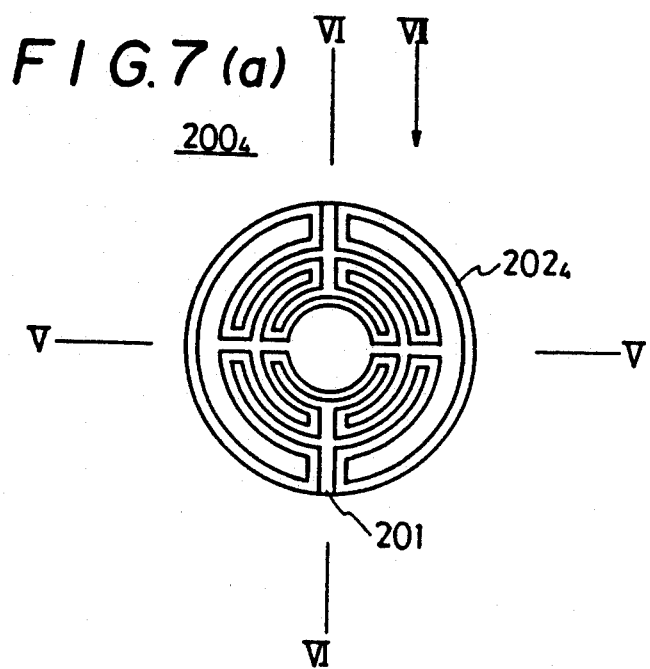
FIG. 7(a) is a bottom view of a valve disk according a still further embodiment of the invention.
Figure 7B:
FIG. 7(b) is a cross section taken along V—V in FIG. 7(a).
Figure 7C:
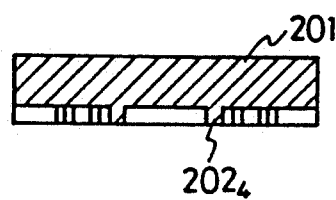
FIG. 7(c) is a cross section taken along VI—VI in FIG. 7(a).
Figure 7D:
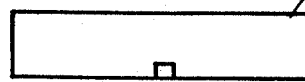
FIG. 7(d) is a view taken in the direction VII in FIG. 7(a).

In valve disks $200_2$ (FIGS. 6(a)-6(c)) to $200_4$ (FIGS. 7(a)-7(c)), the terminal end of primary side passage 101 is positioned substantially in the center of the lower side of disk main body 201. The starting end of secondary side passage 102 is positioned outside disk main body 201. The partition walls $202_2$ to $202_4$ separate primary side passage 101 from their respective secondary side passage 102.

Figure 5A:
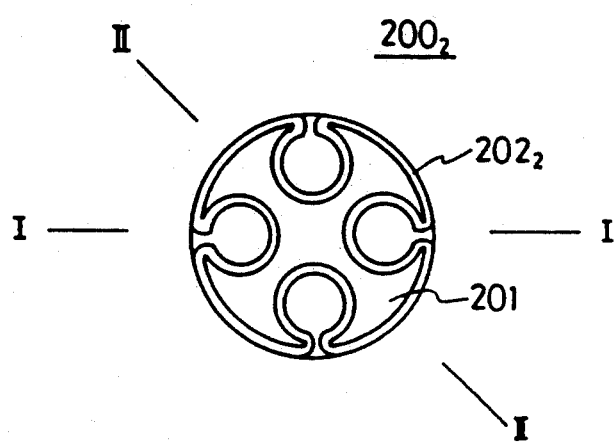
FIG. 5(a) is a bottom view of a valve disk according to an embodiment of the invention.
Figure 5B:
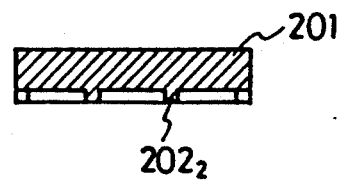
FIGS. 5(b) and 5(c) are cross sections taken along I—I and II—II, respectively in FIG. 5(a).
Figure 5C:
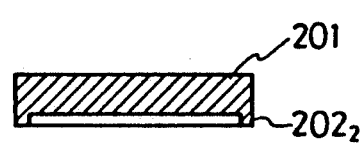

Partition wall $202_2$ of valve disk $200_2$ of FIGS. 5(a)-5(c) includes a circular part, that is divided into four equal parts, about the perimeter of disk main body 201. The circles join adjacent ends of the circular parts, thus forming a closed perimeter.

Referring again to FIGS. 6(a)-6(c), partition wall $202_3$ of valve disk $200_3$ has a first circular part along the lower peripheral edge part of the disk main body 201 and second and third circular parts forming circles concentric with the first circular part. The first and third circular parts of partition wall $202_3$ are cut into four equal parts. The second circular part is cut into eight equal parts. The cut parts are connected by bridge parts E extending toward the center of the closed curve, along which partition wall 202 is formed.

Referring again to FIGS. 7(a)-7(d), valve disk $200_4$ has a partition wall $202_4$ similar in shape to that of valve disk $200_1$ of FIG. 4. The partition wall in this embodiment differs from that of FIG. 4 only in that jutting parts of partition wall $202_4$ are formed by connecting circular arcs to bridge parts stretching from middle circular part B to inner circular part C, respectively.

Valve disks $200_1$ to $200_4$, described in the preceding paragraphs, have partition walls of different lengths resulting from their different shapes. A particular one may be selected, as necessary, when the length of its partition wall is suitable for the flow rate to be controlled.

Returning now to FIG. 3, the same control valves can be configured for different flow rates by selecting a particular valve disk having a length of partition wall for the application. In use, fluid from primary side passage 101 reaches the central part of the lower surface of disk main body 201 of valve disk 200, flows over partition wall 202, and reaches secondary side passage 102. The amount of flow is varied under control of piezo stack actuator 110.

Figure 11:
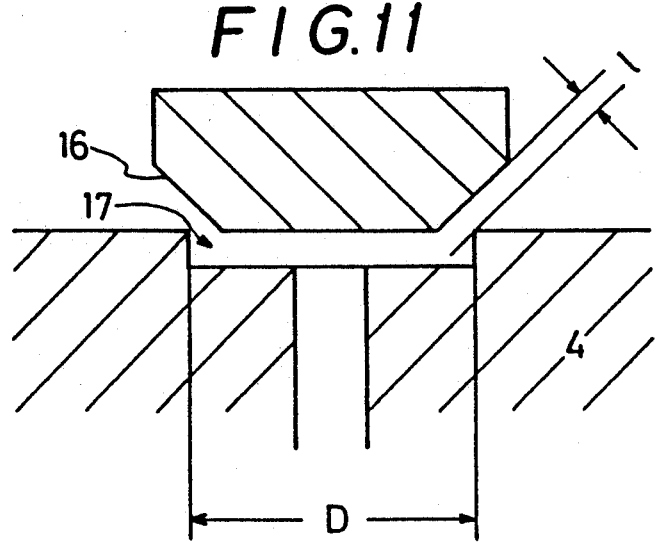
FIG. 11 is a cross section of a portion of a control valve to which reference will be made in explaining the principal of control of flow rate by fluid flow control valves.

Increasing the length of partition wall 202 increases the quantity of fluid overflow in the valve chamber, thus increasing flow output, while the diameter of valve disk 200 is unchanged. The flow rate control under these circumstances is exceptional even when the gap of the orifice is as small as 40-50 microns, as described previously and shown in FIG. 11.

Referring to FIGS. 1(a)-1(b) and 2(a)-2(b), fluid flow control valves shown in these figures are substantially the same as the valve shown in FIG. 3, with the exception that the valve chambers in FIGS. 1(a)-2(b) are much larger.

A cylindrical valve seat guide 121 is fitted into the terminal end of primary side passage 101 in the base block 100. The upper end of valve seat guide 121 is recessed in its hole to form a spring retaining hole. A coil spring 123 is fitted into the spring retaining hole. A valve seat 122 is fitted over valve seat guide 121. A hole at the center of valve seat 122 communicates with primary side passage 101 through an axial bore in valve seat guide 121. The facing surfaces of valve seat 122 and a partition wall $202_5$ are polished to a specular finish.

Figure 1A:
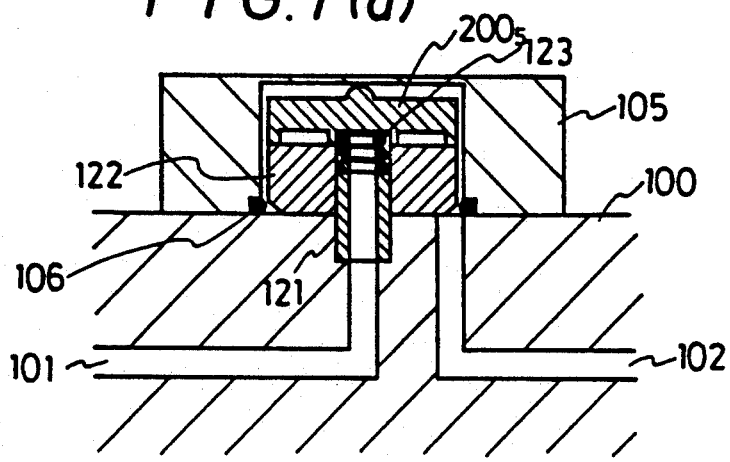
FIG. 1 (b) is a bottom view of the valve disk of FIG. 1 (a)
Figure 1B:
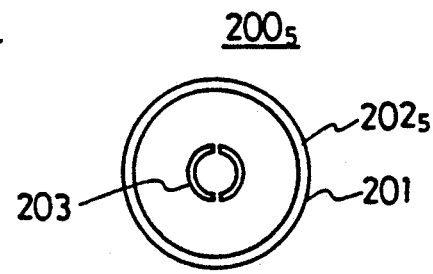
Figure 2A:
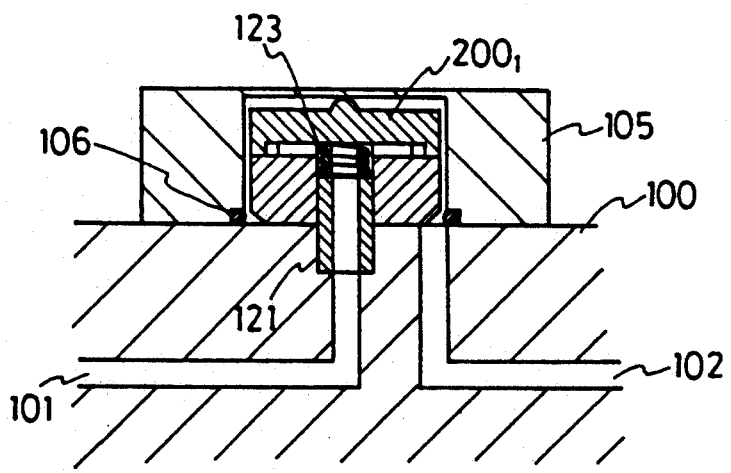
FIG. 2(a) is a cross section of a fluid control valve according to another embodiment of the present invention.
Figure 2B:
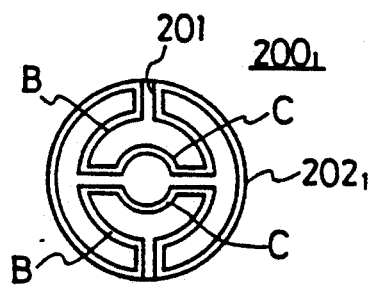
FIG. 2 (b) is a bottom view of the valve disk of FIG. 2 (a)

A valve disk $200_5$ (FIGS. 1(a) and 1(b)) has a disk main body 201 with the same diameter and height as valve disk $200_1$ shown in FIGS. 2(a)-2(b) and 4. Circular partition wall $202_5$ is centered in the lower surface of disk main body 201. A circular spring guide 203 in the central part of the lower surface of disk main body 201 includes two radial cuts at opposed positions on its circumference. A coil spring 123 is disposed between spring guide 203 and valve seat guide 121. Coil spring 123 holds the control valve in the normally open condition.

Fluid from a fluid supply source passes through primary side passage 101, the inside of valve seat guide 121, and the hole of valve seat 122 to reach the inside of the partition wall $202_5$ of valve disk $200_5$. The fluid passes through the cut parts of the spring guide 203, spills over the end part of partition wall $202_5$ and flows into secondary side passage 102 through an orifice in the valve chamber formed by the outer circumferences of valve disk $200_5$ and valve seat 122. The length of partition wall $202_5$ of valve disk $200_5$ is shorter than that of FIG. 2, and this construction corresponds to the illustration in FIG. 11 with a smaller diameter.

In order to pass fluid at a larger flow rate, valve disk $200_5$ of FIG. 1(a) is replaced with a corresponding member having a longer peripheral wall such as, for example, the embodiment shown in FIG. 2(a). Coil spring 123 is fitted inside inner circular part C of partition wall $202_1$. In a control valve this configured, fluid from the supply source passes through primary side passage 101, the inside of valve seat guide 121 and the hole of valve seat 122 to enter the inside of partition wall $202_1$ of valve disk $200_1$. Then, the fluid spills over the end part of partition wall $202_1$ and flows out into secondary side passage 102 through the orifice of the valve chamber formed on the outer circumferences of valve disk $200_1$ and valve seat 122. The length of partition wall $202_1$ of valve disk $200_1$ is much larger than that of the valve disk $200_5$ since the fluid flows out into secondary side passage 102 over the entire length of partition wall $202_1$. Accordingly, the flow rate is increased by increasing the length of the partition wall over which the fluid spills.

Figure 8:
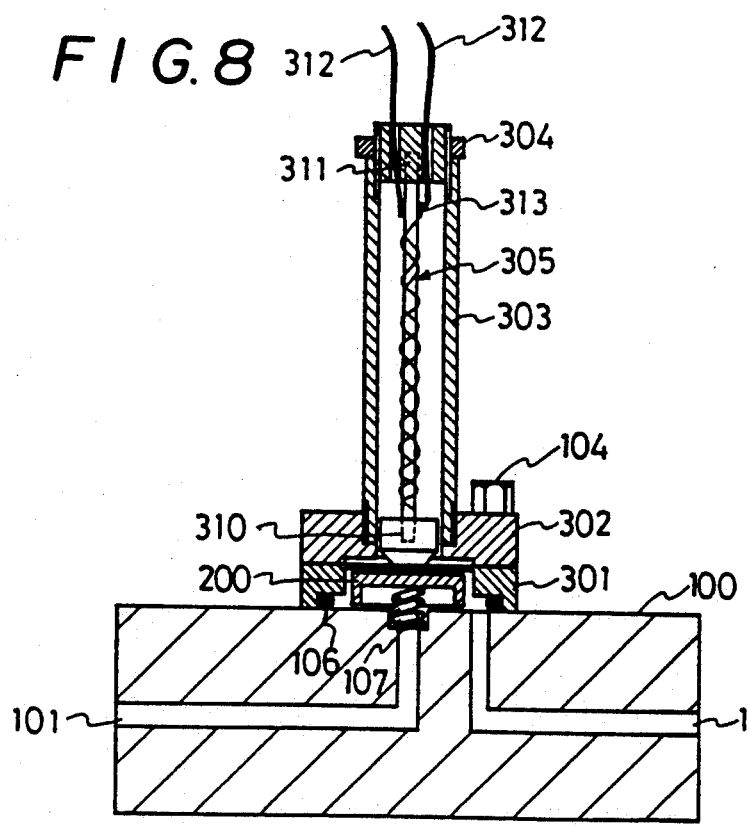
FIG. 8 is a cross section of a fluid control valve of the normally open type using a thermal expansion type actuator.

Referring now to FIG. 8, a normally open fluid flow control valve uses a thermal expansion type actuator with a valve disk 200 of the present invention. A valve base 302 clamps a diaphragm 301 onto the top surface of base block 100 using, for example, a screw 104. A hole in valve base 302 receives the bottom end of a cylinder 303. Cylinder 303 is fixed in place by, for example, screws (not shown).

An actuator 305 is centrally positioned within cylinder 303.

Figure 9:
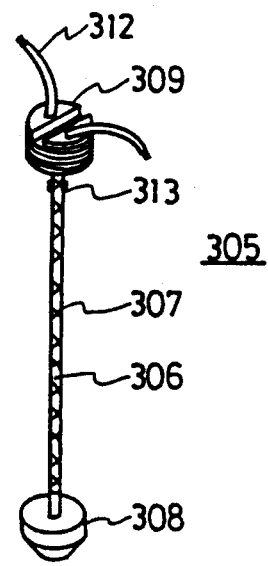
FIG. 9 is a perspective view of the actuator assembly of the fluid control valve shown in FIG. 8.

Referring now also to FIG. 9, actuator 305 has a heater wire 307 wound on a thermally-expanding rod body 306. A spacer 308 is welded to a lower end of rod body 306 of actuator 305. An adjusting screw 309 is welded to an upper end rod body 306. A locking ring 304 is threaded onto adjusting screw 309 where it can contact the upper end of cylinder 303. Lead wires 312 pass through adjusting screw 309. Inside cylinder 303, lead wires 312 are welded to heater wire 307 at connection welds 313.

Heater wire 307 is heated by impressing a voltage through lead wires 312, which causes thermal expansion of rod body 306. The expansion of rod body 306 causes downward pressure through spacer 308 that urges diaphragm 301 toward valve disk 200. Downward displacement of valve disk 200 narrows the opening between the end face of the partition wall of valve disk 200 and the valve seat portion on base block 100 opposite the end face. Varying the voltage impressed on rod body 306 controls the flow rate through the control valve. A nominal opening of the orifice opening is set with adjusting screw 309 at the top of cylinder 303.

Figure 10A:
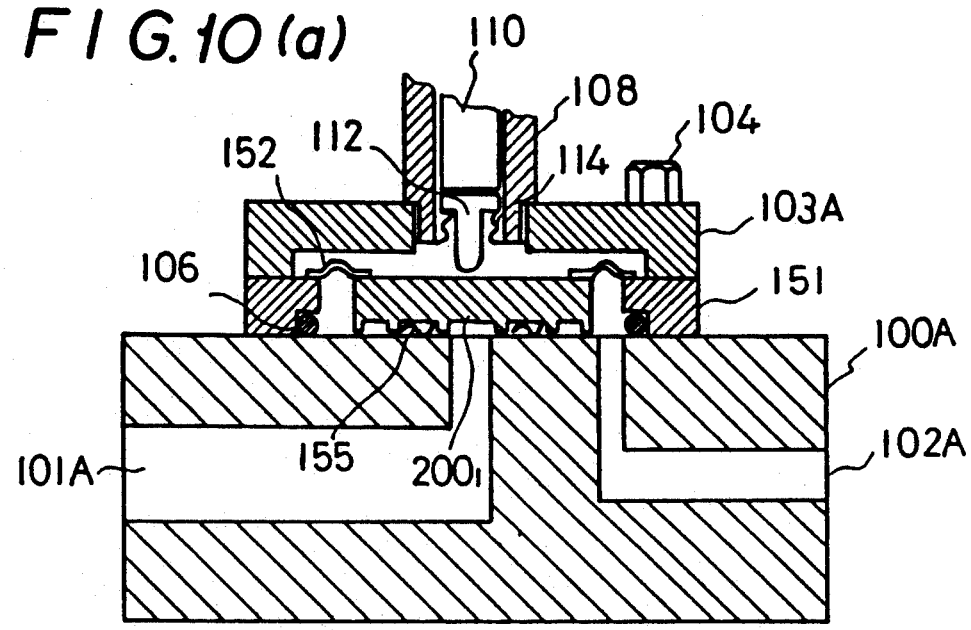
FIG. 10(a) is a cross section of another embodiment of the present invention.
Figure 10B:
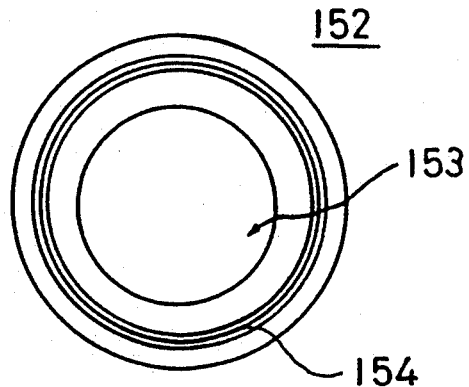
FIG. 10(b) is a top view of a diaphragm of FIG. 10(a).

Referring now to FIG. 10($a$), a fluid control valve is similar to above-described embodiments of the invention. The differences are discussed below.

A ring-shaped coupling body 151 is clamped to a base block 100A by a valve base 103A using, for example, screw 104. A primary side passage 101A and a secondary side passage 102A are formed in base block 100A. A ring-shaped diaphragm 152, having a hole 153 at its center, is welded between the outer edge part of the upper part of valve disk $200_1$ and the inner edge of the upper part of coupling body 151. A projecting rib 154 near the middle of diaphragm 152 resiliently urges valve disk $200_1$. A leaf spring 155 on the opposite side of the partition wall of valve disk $200_1$, pushes valve disk $200_1$ part way toward a valve seat to produce a normally open fluid flow control valve.

Lower spacer 112 passes through hole 153 in diaphragm 152 to contact the center of valve disk $200_1$. As piezo stack actuator 110 expands axially, lower spacer 112 applies force to valve disk $200_1$, thereby controlling the flow of fluid.

Accordingly, it is apparent that the fluid flow control valve of the present invention includes embodiments wherein the control force is applied either directly to the valve disk, as in FIG. 10($a$), or through a diaphragm 152, as shown in FIG. 3.

While the foregoing embodiments are described with respect to cases wherein the piezo stack actuator and a thermal actuator, the present invention is also adapted for use with any other convenient type of actuator such as, for example, mechanical, hydraulic, servomechanical, electromagnetic or magnetostrictive. The control valve of the present invention may be normally open or normally closed, without departing from the spirit and scope of the invention.

Moreover, the closed curve formed by the partition wall on the valve disk can assume any convenient shape such as, for example, polygon, pentagram or a petal.

Normally, the flow rate in the valve disk of the present invention is increased as the length of the partition wall is increased. However, when the distance between adjacent partition walls, e.g., the distance between circular parts B and C in FIG. 4, is smaller than the distance between the valve disk and the valve seat (this will not occur generally since the latter is several tens of microns), the desired effect of increasing the flow rate with increased partition length is not realized.

Instead of providing the partition wall on the valve disk, the partition wall may be formed on the valve seat. In this case, the surface of the valve disk opposite, the valve seat is flat. The operation of this embodiment is the same as those previously described.

The valve seat in the present invention may be a hole formed simply in the valve chamber or a projecting or recessed block formed to serve as a valve seat.

Having described preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. A fluid control valve comprising
   a base block and a valve base received on the base block, there being a diaphragm in the valve base which with the base block defines a valve chamber, a surface of the base block in the valve chamber presenting a valve seat,
   a primary side passage in the base block, and a secondary side passage in the base block, a terminal end of the primary side passage and an initial end of the secondary passage being located at the valve seat presenting surface of the base block,
   a valve disc in the valve chamber, the valve disc having a solid main body, a face of the main body confronting the valve seat, the terminal end of the primary side passage being positioned below a central part of the valve disc valve seat confronting face,
   means normally urging the valve disc away from a valve seat engaging position wherein it covers the terminal end of the primary passage to a position wherein said primary passage terminal end is uncovered, the initial end of the secondary passage being located laterally beyond a perimeter expanse of the valve disc so that with the valve disc in that urged away position, an orifice gap exists between the valve disc and valve seat through which fluid flow from the primary passage can pass to the secondary passage, and
   partition means carried on the valve disc valve seat confronting face and extending therefrom towards the valve seat, said partition means including first partition wall parts extending along perimeter lengths of the valve disc, and other partition wall parts extending inwardly of the valve disc perimeter and joined to first partition wall parts and each other such as to define closed wall shapes, a flow of the fluid through the orifice gap first reaching the valve disc confronting face central part and therefrom overflowing the partition wall parts to pass beyond the valve disc perimeter for accessing the secondary passage, said flow being controllable at a rate which is related to the wall lengths of the closed shapes.

2. A fluid control valve in accordance with claim 1 in which an increase in partition wall length for a given valve disc diameter increases the fluid flow rate.

3. A fluid control valve in accordance with claim 1 further comprising means operable for moving the valve disc toward seat engaging position in opposition to the urging means to set an orifice gap between the valve disc and valve seat of predetermined value.

4. A fluid control valve in accordance with claim 3 in which the predetermined gap is one in a range of about 40 to about 50 microns.

* * * * *